United States Patent
Hebert et al.

(10) Patent No.: US 11,539,742 B2
(45) Date of Patent: Dec. 27, 2022

(54) APPLICATION SECURITY THROUGH MULTI-FACTOR FINGERPRINTING

(71) Applicant: SAP SE, Walldorf (DE)

(72) Inventors: Cedric Hebert, Mouans Sartoux (FR); Andrea Palmieri, Zurich (CH); Merve Sahin, Antibes (FR); Anderson Santana de Oliveira, Antibes (FR)

(73) Assignee: SAP SE, Walldorf (DE)

( * ) Notice: Subject to any disclaimer, the term of this patent is extended or adjusted under 35 U.S.C. 154(b) by 30 days.

(21) Appl. No.: 16/696,588

(22) Filed: Nov. 26, 2019

(65) Prior Publication Data

US 2021/0160277 A1 May 27, 2021

(51) Int. Cl.
*H04L 29/06* (2006.01)
*H04L 9/40* (2022.01)

(52) U.S. Cl.
CPC ................ *H04L 63/1466* (2013.01)

(58) Field of Classification Search
CPC .................................. H04L 63/1466
See application file for complete search history.

(56) References Cited

U.S. PATENT DOCUMENTS

| | | | | |
|---|---|---|---|---|
| 10,013,577 | B1 * | 7/2018 | Beaumont | H04L 63/1433 |
| 2002/0108059 | A1 * | 8/2002 | Canion | H04L 69/12 |
| | | | | 709/224 |
| 2003/0236995 | A1 * | 12/2003 | Fretwell, Jr. | H04L 67/14 |
| | | | | 726/25 |
| 2008/0256172 | A1 | 10/2008 | Hebert et al. | |
| 2009/0077376 | A1 | 3/2009 | Montagut et al. | |
| 2009/0222399 | A1 | 9/2009 | Gomez et al. | |
| 2009/0327317 | A1 | 12/2009 | Ulmer et al. | |
| 2010/0333167 | A1 * | 12/2010 | Luo | H04L 63/1441 |
| | | | | 706/14 |
| 2012/0042364 | A1 | 2/2012 | Hebert | |
| 2012/0311027 | A1 * | 12/2012 | Salusky | G06F 16/24575 |
| | | | | 709/203 |
| 2012/0317622 | A1 * | 12/2012 | Harjanto | G06F 21/44 |
| | | | | 726/4 |
| 2013/0160079 | A1 | 6/2013 | Hebert | |
| 2013/0262397 | A1 | 10/2013 | Hebert | |
| 2014/0372927 | A1 | 12/2014 | Hebert et al. | |
| 2015/0033346 | A1 | 1/2015 | Hebert et al. | |

(Continued)

OTHER PUBLICATIONS

Sanchez-Rola et al., "Clock Around the Clock: Time-Based Device Fingerprinting", Oct. 2018, ACM SIGSAC Conference, 13 pgs.

(Continued)

*Primary Examiner* — Vance M Little
(74) *Attorney, Agent, or Firm* — Klarquist Sparkman, LLP

(57) ABSTRACT

Systems, methods, and computer media for securing software applications are provided herein. The multi-factor fingerprints allow attackers to be distinguished from authorized users and allow different types of attacks to be distinguished. The multi-factor fingerprint can include, for example, a session identifier component, a software information component, and a hardware information component. The different components can be separately compared to components of stored fingerprints to determine whether an application session request is malicious, and if so, what type of attack, such as session cookie theft or a spoofing attack, is occurring.

20 Claims, 8 Drawing Sheets

(56) References Cited

U.S. PATENT DOCUMENTS

| | | | |
|---|---|---|---|
| 2015/0237039 A1* | 8/2015 | Grajek | H04L 67/02 726/8 |
| 2016/0078234 A1 | 3/2016 | Li et al. | |
| 2016/0099953 A1 | 4/2016 | Hebert et al. | |
| 2016/0112376 A1 | 4/2016 | Gomez et al. | |
| 2016/0203487 A1* | 7/2016 | Eisen | G06Q 30/0635 705/44 |
| 2016/0337962 A1* | 11/2016 | Peng | H04L 41/0806 |
| 2017/0019421 A1 | 1/2017 | Hebert et al. | |
| 2017/0169217 A1 | 6/2017 | Rahaman et al. | |
| 2017/0177308 A1 | 6/2017 | Montagnon et al. | |
| 2017/0177310 A1 | 6/2017 | Mathias et al. | |
| 2018/0004978 A1 | 1/2018 | Hebert et al. | |
| 2018/0041546 A1 | 2/2018 | Gomez et al. | |
| 2018/0077174 A1 | 3/2018 | Hebert | |
| 2019/0068641 A1 | 2/2019 | Araujo et al. | |

OTHER PUBLICATIONS

"Observations From the Front Lines of Threat Hunting: A 2018 Mid-Year Review From Falcon OverWatch", https://go.crowdstrike.com/rs/281-OBQ-266/images/Report2018OverwatchReport.pdf, 20 pgs.

"The RASP market size is expected to grow from USD 294.7 million in 2017 to USD 1, 240.1 million by 2022, at a Compound Annual Growth Rate (CAGR) of 33.3%", https://www.prnewswire.com/news-releases/the-rasp-market-size-is-expected-to-grow-from-usd-2947-million-in-2017-to-usd-12401-million-by-2022-at-a-compound-annual-growth-rate-cagr-of-333-300578893.html, Jan. 8, 2018, 4 pgs.

Canarytokens by Thinkst, https://canarytokens.org/generate, accessed Aug. 13, 2019, 1 pg.

AppSensor DetectionPoints, https://www.owasp.org/index.php/AppSensor_DetectionPoints, accessed Aug. 13, 2019, 38 pgs.

* cited by examiner

APPLICATION SECURITY THROUGH MULTI-FACTOR FINGERPRINTING

BACKGROUND

With widespread adoption of software applications and cloud-based services, cyber security has become increasingly important. Attackers employ various malicious techniques to gain unauthorized access to applications and associated data. In addition to exploiting software bugs and vulnerabilities, some attackers obtain valid credentials or other information for authorized users and use this information to gain unauthorized access to applications or computer systems. Detecting and managing such unauthorized access is challenging.

DETAILED DESCRIPTION

Figure 1:
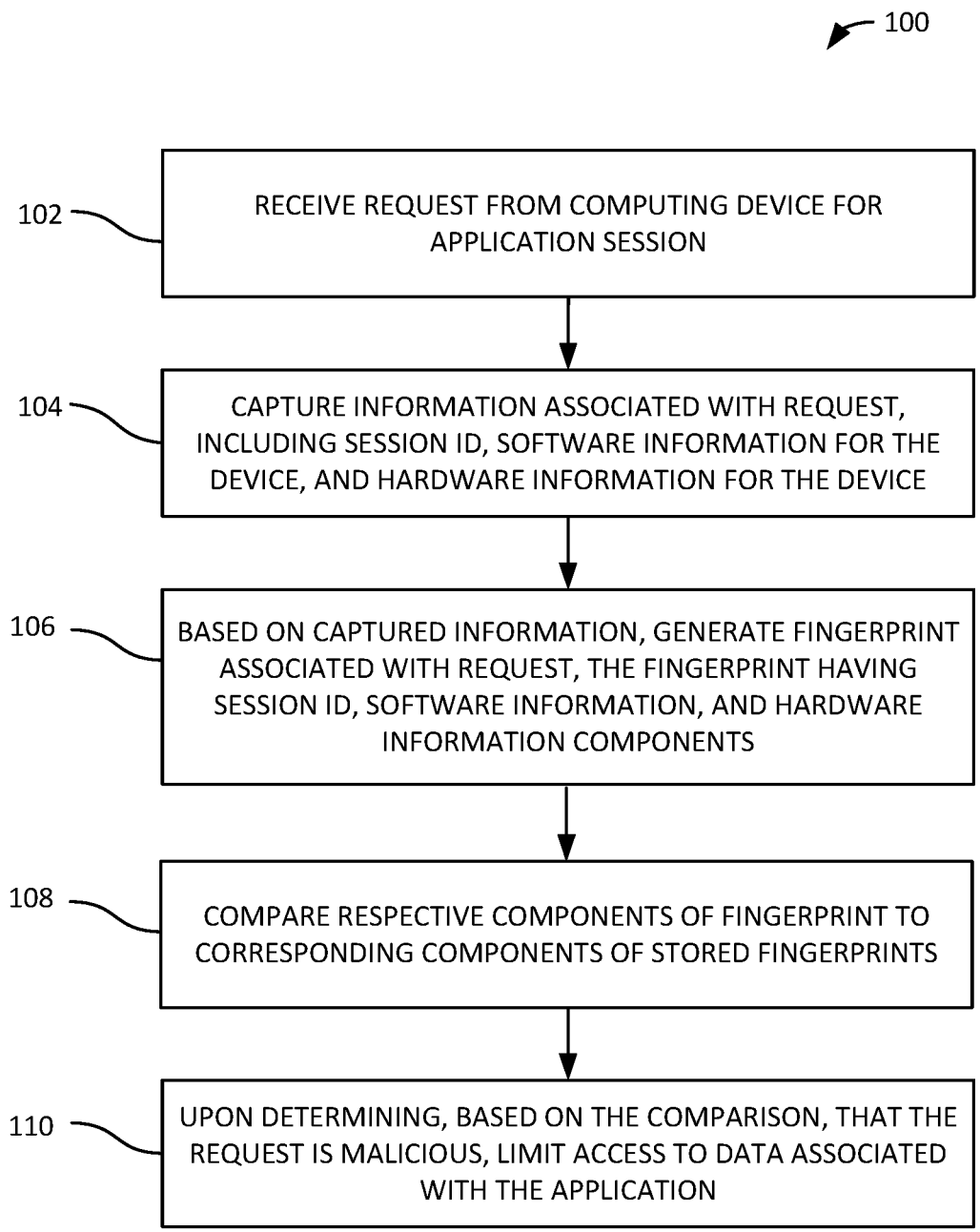
FIG. 1 illustrates an example method of securing an application using multi-factor fingerprinting.

The examples described herein generally secure software applications against unauthorized access. Using a multi-factor fingerprint, the described examples allow detection and management of unauthorized users attempting to access an application. The multi-factor fingerprint also allows different types of attacks to be distinguished so that vulnerabilities can be addressed and inadvertent limitation of access for authorized users can be reduced. The multi-factor fingerprint can include, for example, a session identifier component, a software information component, and a hardware information component. In some examples, the multi-factor fingerprint can also include a user information component and a location information component. The different components can be separately compared to components of stored fingerprints to determine whether an application session request is malicious, and if so, what type of attack is occurring.

In a specific web application example, a request for a session is sent to an application from a web browser. The application captures various information associated with the request and generates a multi-factor fingerprint. For a software information component, the application can send the browser a task to perform, such as rendering an image, and a hash of the result can be captured and stored. Metadata related to hardware of the device on which the browser is running (e.g., number of processors, screen resolution, etc.) can be captured and stored as the hardware information component. The application can also capture a session cookie associated with the request and store the cookie as the session identifier component of the multi-factor fingerprint.

In this web application example, the different components of the multi-factor fingerprint can be separately compared to components of stored fingerprints (stored fingerprints known to be malicious and/or stored fingerprints of authorized users) to both detect malicious session requests and distinguish malicious requests from authorized session requests in which some components of the multi-factor fingerprint have changed. For example, if a comparison reveals that the session cookie of the request matches a session cookie for a fingerprint associated with a different user or with a different hardware component, a determination can be made that the request is malicious (cookie theft). In contrast, if the session cookie matches a session cookie for a fingerprint associated with the same user and the same hardware information component but a different browser information component, it can be determined that the request is from a new device (e.g., a browser update) but is not malicious.

Access to the application and associated data can be limited upon determination that a session request is malicious. In some examples, the session request is denied. In other examples, to avoid alerting an attacker that the attack has been detected, a session is established with an application clone that appears to be a genuine application session but in which at least some of the data accessed through the clone is fake data. In this way, the attacker's behavior and targets can be observed without compromising real data.

The described approaches to securing an application using a multi-factor fingerprint keep data and applications secure from malicious activity while using the different components of the fingerprint to determine the type of attack and to identify situations in which session requests are not malicious even though some information in the fingerprint differs from stored fingerprints. Examples are described below with reference to FIGS. 1-8.

FIG. 1 illustrates a method 100 for securing an application using multi-factor fingerprinting. In process block 102, a request is received from a computing device for a session with the application. The request can be submitted, for example, by a web browser, and the computing device can be a client computing device communicating with one or more server computers executing the application. In some examples, the application is a local application executing on the computing device that submits the session request. The request can include, for example, a username and/or password, a session identifier, metadata associated with hardware of the computing device, metadata associated with a browser or other software of the device, or other information.

In process block 104, information associated with the request is captured. The information includes a session identifier, software information for the device, and hardware information for the device. The session identifier (e.g., a session cookie) can be generated when the request is received or can be transmitted with the request. The software information for the device can be web browser information or information related to the operating system or one or more software applications installed on the computing device (e.g., version numbers, date of installation, number of installed applications, preferences, etc.). Web browser information can include the name or version of the browser. In some examples, the application provides a challenge or other information to the browser, the browser provides a response, and the response is used to form the browser information. For example, the application can provide instructions for the browser to render an image, and the results provided by the browser can be hashed together or otherwise combined to form the software information component of the fingerprint. JS Fingerprint 2, Crypto FP, and Web GL are examples of approaches to obtaining browser information.

Hardware information can include, for example, a number or type of processor of the computing device, a display resolution of a display associated with the computing device, a graphics processing unit of the computing device, an amount of memory of the computing device, or other information. The hardware information can accompany the session request sent by the computing device or can be requested by the application.

Based on the captured information, a fingerprint associated with the request is generated in process block 106. The fingerprint has session identifier, software information, and hardware information components and is also referred to herein as a "multi-factor fingerprint." In some examples, the captured information also includes location information such as IP address, time zone, country, city, or postal code and/or user information such as username and/or password, other user credentials, or user demographics. In examples where the captured information includes location information or user information, the fingerprint has a corresponding location information or user information component.

The respective components of the fingerprint associated with the request are compared to corresponding components of a group of stored fingerprints in process block 108. Unlike other fingerprinting approaches in which various pieces of information are combined into a single fingerprint that is treated as a whole, the components of the fingerprint associated with the request can be separately compared with corresponding components of other fingerprints. That is, the hardware information components of different fingerprints can be compared, software information components can be compared, and session identifier components can be compared. The ability to identify specific information that is unexpected or different from stored information allows for a more accurate threat assessment for session requests and a more complete understanding of malicious activity.

Upon determining, based on the comparison, that the request for the session is malicious, access to data associated with the application is limited in process block 110. Access can be limited, for example, by denying the session request. Access can also be limited by establishing a cloned application session in which at least some of the data provided in the cloned application session is alternative ("fake") data provided in place of data associated with the application. In some examples, when a request is determined to be malicious, an alert or warning is generated and sent to an authorized user whose credentials may have been compromised or to a developer or other individual associated with the application.

The request for the session can be determined to be malicious for a variety of reasons. For example, the request can be determined to be malicious when the software information component of the fingerprint matches software information of a different fingerprint in the group of stored fingerprints. Such a situation can indicate, for example, a spoofing attack in which an unauthorized user has gained access to an authorized user's browser response or other software information. As another example, the request can be determined to be malicious when the session identifier component of the fingerprint matches a session identifier component of a different fingerprint, and the different fingerprint is associated with at least one of a different user or different hardware information than the hardware information component of the fingerprint associated with the request. Such situations can indicate session identifier theft.

Sessions requests and sessions can also be determined to be malicious if a honeytoken or threat detection point has been "touched," such as the user visiting an "/admin" URL or modifying an "is_admin" cookie value. As used herein, a "honeytoken" is an aspect added to an application that, when interacted with, indicates a malicious session. Honeytokens can also be referred to as, for example, deceptive elements, bread crumbs, canaries, or canary tokens. Honeytokens can be files, folders, URLs, options, usernames/passwords (e.g., admin/admin), old passwords, blacklisted credentials, or other items that are specifically added to an application so that if an attacker interacts with the honeytoken, the attack can be discovered. "Threat detection points" as used herein are similar to honeytokens but refer to existing aspects of an application with which interaction indicates a malicious session. Threat detection points can also be referred to as "tripwires," and can also be detection rules used in intrusion detection systems.

Figure 2:
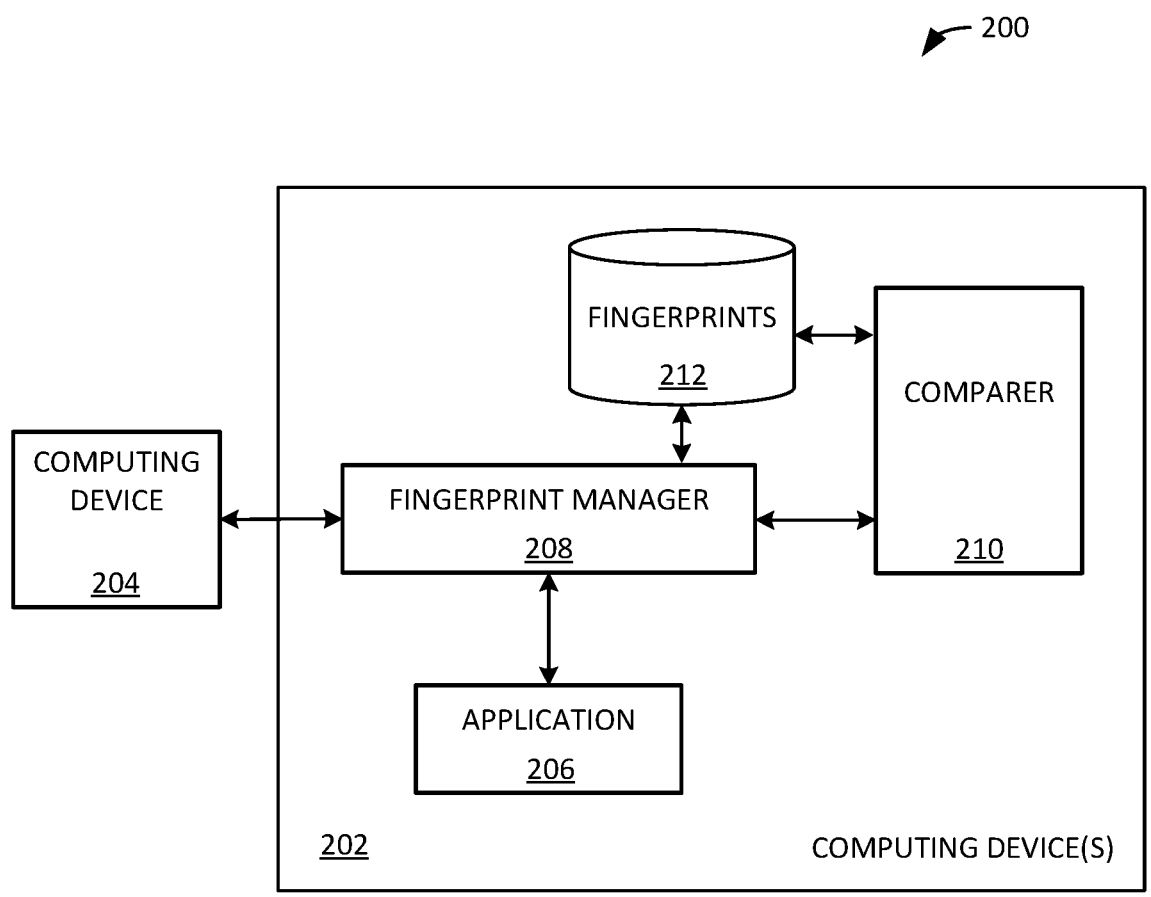
FIG. 2 is an example multi-factor fingerprinting application security system.

FIG. 2 illustrates an application security system 200. System 200 can be implemented using computing device(s) 202. Computing device(s) 202 can be, for example, one or more centralized server computers, distributed computers, or a cloud computing system. Computing device(s) 202 include at least one processor and at least one memory, and can, for example, implement method 100 of FIG. 1. Computing device 204, which can be a client computing device, sends a request for a session with an application 206. In some examples, application 206 is a local application, and computing device 204 and computing device(s) 202 are the same device. In other examples, application 206 is a web application and computing device 204 is a client computing device communicating over a network with computing device(s) 202.

Fingerprint manager 208 acts as a proxy or reverse proxy and intercepts the session request. Fingerprint manager 208 captures information associated with the session request and determines a fingerprint associated with the session request. The fingerprint includes a session identifier component (e.g., session cookie), hardware information component (e.g., processor information, graphics information, etc.), and software information component (e.g., browser information, operating system information, or other application information). In some examples, the fingerprint also includes a user information component (e.g., username) and/or a location information component (e.g., IP address, time zone, country, etc.).

In some examples, fingerprint manager 208 requests particular information from computing device 204, such as sending computing device 204 a browser challenge or other information, and the response from computing device 204 is used to determine the software information component. Fingerprint manager 208 can also request metadata, location information (e.g., IP address, time zone, etc.) or other information from computing device 204. In some examples, fingerprint manager 208 retrieves metadata (e.g., hardware metadata) or other information that are transmitted with the session request.

Fingerprint manager 208 sends the fingerprint associated with the session request to a comparer 210. Comparer 210 compares the different components of the fingerprint to the respective components of other fingerprints stored in fingerprint storage 212. The fingerprints stored in fingerprint storage 212 correspond to previous session requests and can include requests determined to be malicious as well as non-malicious session requests. In some examples, comparer 210 generates the fingerprint based on information provided by fingerprint manager 208. Examples of the comparisons of various fingerprint components are discussed in more detail with respect to FIG. 6.

Figure 3:
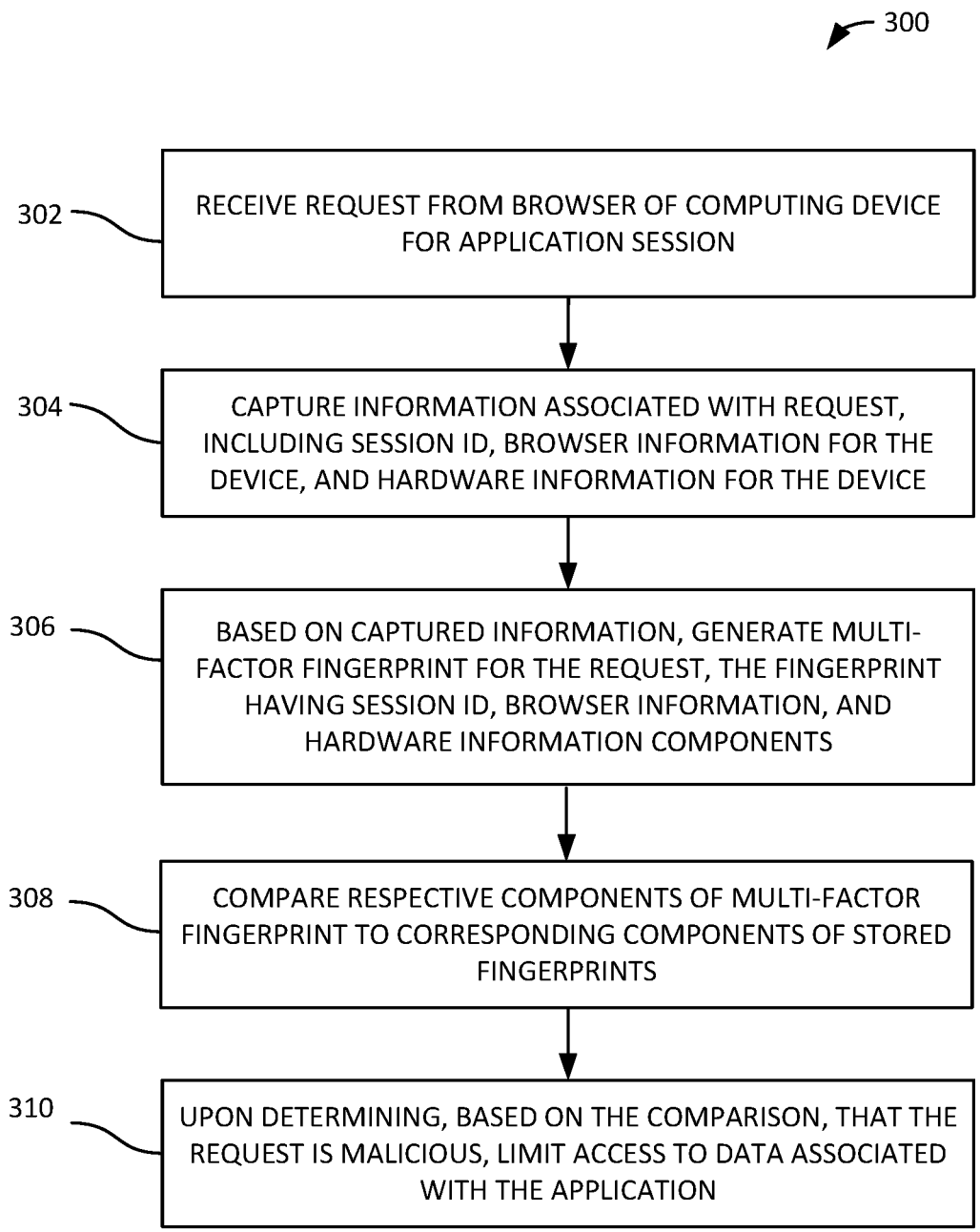
FIG. 3 illustrates an example method of securing an application using multi-factor fingerprinting in which an application session request is received from a browser.

FIG. 3 illustrates a method 300 of securing an application using multi-factor fingerprinting in which an application session request is received from a browser. In process block 302, a request is received from a browser of a computing device for a session with an application. The request can be received, for example, at a server computer, and the application can be a web application. In process block 304, information associated with the request is captured. The information includes a session identifier, browser information for the device, and hardware information for the device. In some examples, user information and location information is also captured. In process block 306, a multi-factor fingerprint is generated for the request based on the captured information. The multi-factor fingerprint has separately comparable components including a session identifier component, a browser information component, and a hardware information component.

The respective components of the multi-factor fingerprint associated with the request are compared to corresponding components of a group of stored fingerprints in process block 308. Upon determining, based on the comparison, that the request for the session is malicious, access to data associated with the application is limited in process block 310. Access to the data associated with the application can be limited by denying the session request or establishing a cloned application session in which at least some of the data provided in the cloned application session is alternative data provided in place of data associated with the application. The request for the session can be determined to be malicious when the browser information component of the multi-factor fingerprint matches browser information of a different fingerprint in the group of stored fingerprints, indicating, for example, a spoofing attack.

In some examples, the session identifier is a session cookie. In such examples, the request for the session can be determined to be malicious when the session cookie for the multi-factor fingerprint matches a session cookie of a different fingerprint in the group of stored fingerprints, indicating cookie theft. For example, the session cookie for the multi-factor fingerprint can match a cookie associated with a different user or a cookie associated with different hardware information than the hardware information component of the multi-factor fingerprint.

Figure 4:
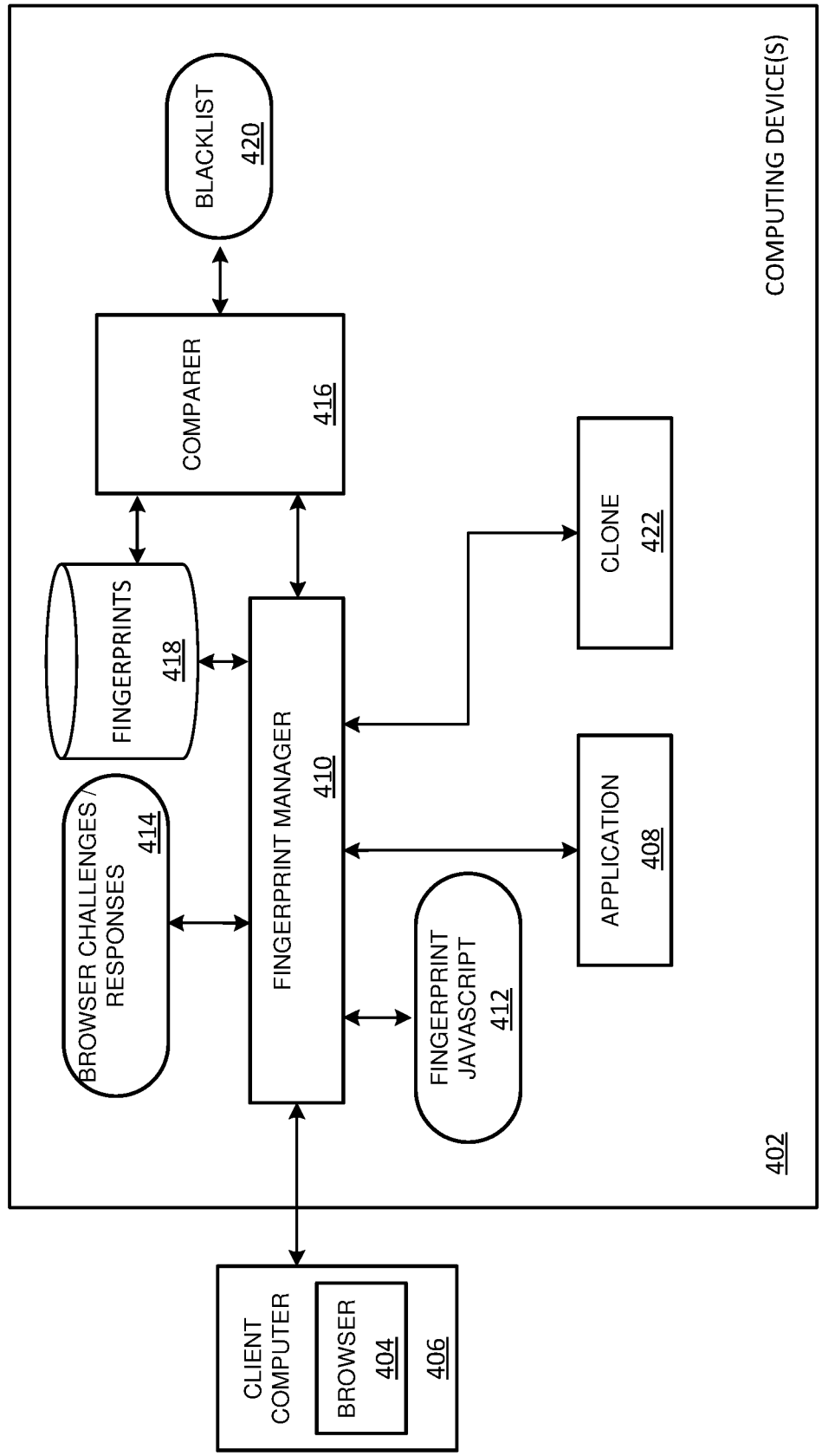
FIG. 4 is an example multi-factor fingerprinting application security system configured to direct malicious users to an application clone.

FIG. 4 illustrates a multi-factor fingerprinting application security system 400 implemented on one or more computing device(s) 402. System 400 is configured to implement the methods illustrated, for example, in FIGS. 1, 3, 5, 6, and 7. Browser 404 running on client computer 406 submits a request for a session with application 408. Fingerprint manager 410 acts as a reverse proxy and intercepts the request. After a user interacting with browser 404 enters credentials (e.g., username/password) and is authenticated with application 408, fingerprint manager 410 captures information used to create a multi-factor fingerprint for the session request.

Fingerprint manager 410 fetches a static fingerprint JavaScript code 412 and sends the code to browser 404 along with a browser challenge assigned to the authenticated user and stored in browser challenges/responses 414. The browser challenge can be pre-determined and associated with the particular user or a group of users. In this way, different browser challenges can be used for different users. JavaScript code 412 is configured to extract information of interest from client computer 406, such as the number of CPUs, WebGL vendor, pixel ratio or other display information, internal IP address, time zone, default language, or other information. In some examples the information extracted from client computer 406 is provided with the session request by browser 404.

Web browser 404 executes JavaScript code 412 and returns information extracted from client computer 406 by JavaScript code 412, as well as a response to the browser challenge, to fingerprint manager 410. In some examples, fingerprint manager 410 generates a fingerprint for the session request. In other examples, fingerprint manager 410 provides information to a comparer 416, and comparer 416 generates the fingerprint. In some such examples, fingerprint manager 410 provides some or all of the following: the username of the user interacting with browser 404, the request's IP address, an expected response to the browser challenge, the actual challenge response received back from browser 404, a session cookie or other identifier determined by application 408, and information extracted via JavaScript code 412.

Comparer 416 (or fingerprint manager 410) generates a multi-factor fingerprint including the session cookie (session identifier component), challenge response (browser information component), and a hardware information component using one or more pieces of the information returned by JavaScript code 412. In some examples, the multi-factor fingerprint also includes the username (user information component) and the external IP address (which can also be combined with time zone, language, and/or internal IP address, for a location information component).

Comparer 416 compares the respective components of the multi-factor fingerprint to a group of fingerprints stored in fingerprints storage 418. The fingerprints in the group can be fingerprints for other users who have logged into application 408 (or other applications) in the past. In some examples, individual users have more than one fingerprint corresponding to different location, browser, and/or hardware information (e.g., logging in from home at a different location and with different hardware as compared to a work login). If the session request is determined to be malicious after the comparison, then the multi-factor fingerprint (or some components of the fingerprint) is added to a blacklist 420. Comparer 416 can also compare fingerprints for current session requests to blacklist 420 to determine if the multi-factor fingerprint has already been blacklisted. Malicious activity can also be detected through triggering of honeytokens or threat detection points, as discussed with reference to FIG. 1.

In some examples, a security notification is issued if malicious activity is detected. The security notification can be, for example, a message sent to an authorized user corresponding to the login credentials or a message sent to a developer, administrator, or other individual associated with application 408. If malicious activity is not detected, then the multi-factor fingerprint for the session request is added to fingerprint storage 418 if not already stored.

Access to application 408 and associated data is limited if the session request is determined to be malicious. In some examples, the session request is denied. In other examples, clone 422 establishes a cloned application session with browser 404 instead of an actual application session. The cloned application session appears to the user associated with browser 404 as an actual application session would, but some or all of the data accessed by the application is "fake" data that is provided so that the attacker does not realize that the attack has been discovered. This approach keeps the actual data associated with application 408 from being exposed and allows for monitoring of the attacker. The fake data can be generated dynamically when a cloned application session is established or can be generated ahead of time. Fake data can be generated by evaluating the type and/or amount of actual data and generating similar data with different values.

Figure 5:
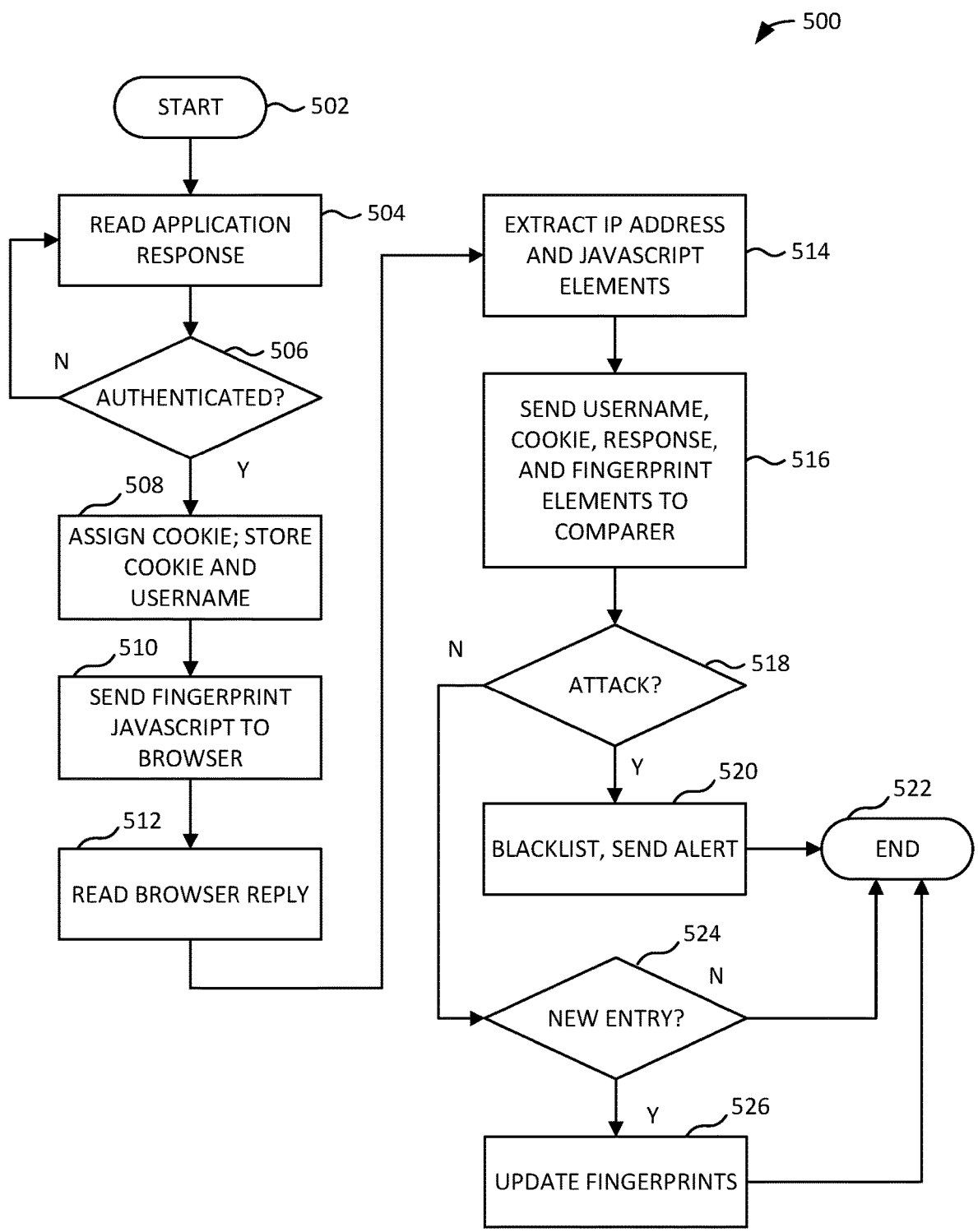
FIG. 5 is an example flowchart illustrating operation of the system of FIG. 4.

FIG. 5 is a flow chart of a method 500 illustrating the operation of system 400 of FIG. 4. In process block 502, method 500 begins. In process block 504, a fingerprint manager (such as fingerprint manager 410 of FIG. 4) reads a response from an application with which a browser (e.g., browser 404 of FIG. 4) is attempting to establish a session. In decision box 506, it is determined if the user associated with the browser has been authenticated by the application. If not, the user is sent to the login page and the fingerprint manager continues to monitor. Once the user has been authenticated, a session cookie is assigned for the session request in process block 508. The session cookie and username provided during authentication are then stored.

In process block 510, a fingerprint JavaScript code (e.g., JavaScript code 412 of FIG. 4) is sent to the browser. The browser provides the information requested by the code, and the browser's reply is read by the fingerprint manager in process block 512. The IP address associated with the computer executing the browser, as well as other information requested by the JavaScript code, is extracted in process block 514. In process block 516, the fingerprint manager sends the username, session cookie, browser response, and extracted information to a comparer (e.g., comparer 416 of FIG. 4) to generate a multi-factor fingerprint for the session request. In some examples, the fingerprint manager generates the fingerprint.

In decision box 518, it is determined if the session request is malicious. Determinations of maliciousness are discussed in detail with respect to FIG. 6. If a session request is found to be malicious, the multi-factor fingerprint is stored in a blacklist, and in some examples, an alert is sent. Method 500 then ends in process block 522. If the session request is not found to be malicious, it is determined in decision box 524 if the multi-factor fingerprint is new or existing. If an entry for the fingerprint already exists, the method ends in process block 522. If an entry for the fingerprint does not exist, an entry is created and fingerprint storage is updated with the entry in process block 526.

Figure 6:
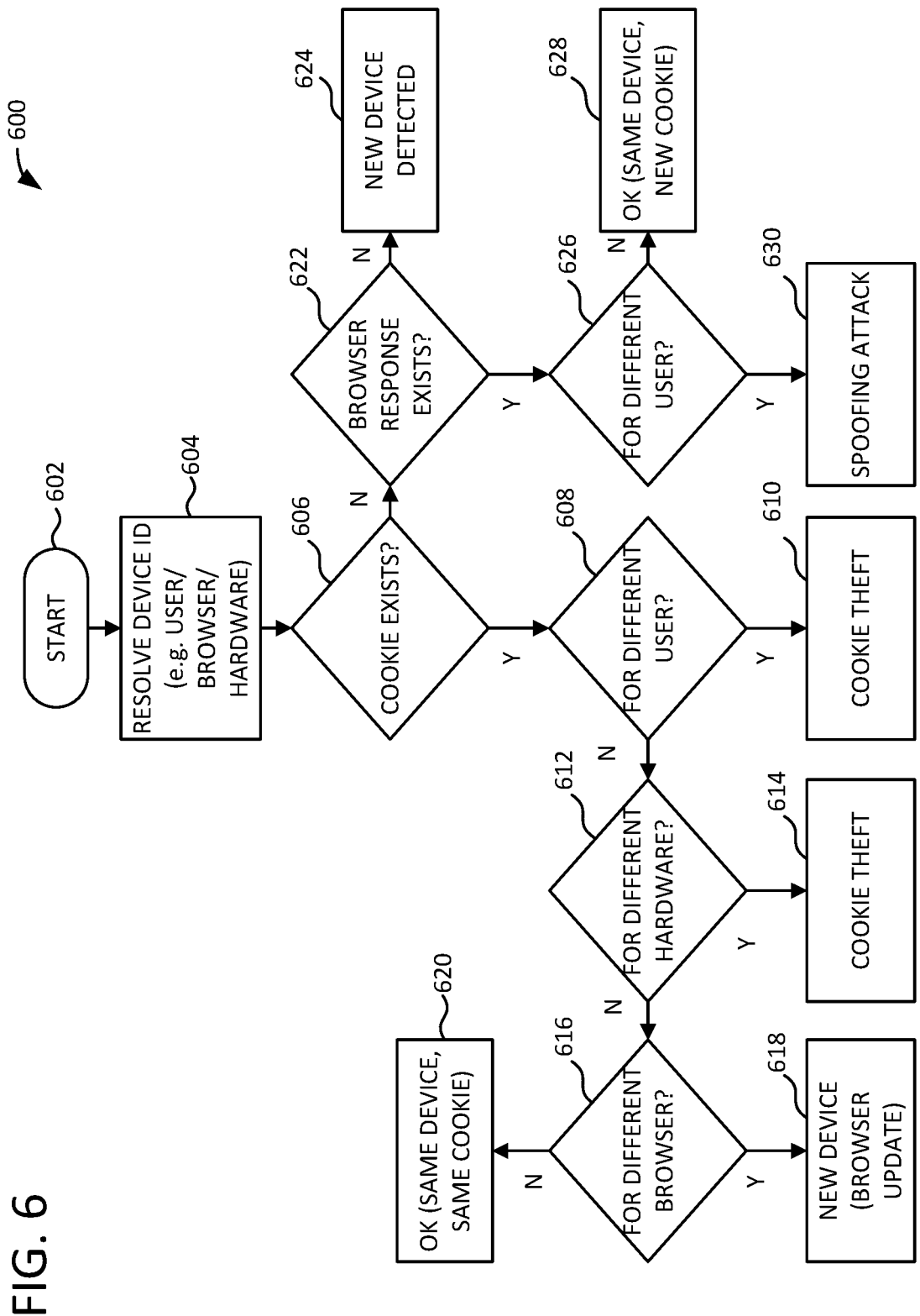
FIG. 6 is an example flowchart illustrating how different types of attacks are detected using multi-factor fingerprinting.

FIG. 6 illustrates a method 600 of determining whether a session request is malicious. In some examples, multi-factor fingerprints include, or are stored in association with: a device identifier, a username or other user information, a session cookie, a browser challenge response or other browser information, hardware information, and a termination flag, such as a yes/no Boolean flag. The comparer checks whether the respective components of the multi-factor fingerprint for a session request match components of stored fingerprints.

Method 600 starts in process block 602. In process block 604, a comparer determines whether a stored fingerprint matches the username, browser information, and hardware information corresponding to a session request. Fingerprints can also have an associated device identifier. For example, if a user establishes an application session from a first browser on a work device and also establishes an application session from a different browser on a home computer, the user will have two different fingerprints that each have a different device identifier (e.g., device one and device two). If there is a fingerprint match, the corresponding device identifier for the fingerprint is stored. If there is no match, a value of 0 is returned.

In decision block 606, it is determined whether the session cookie associated with the request matches the session cookie of any stored fingerprint. If a match is found, it is determined in decision block 608 whether the cookie is associated with a different user than the session request. If so, in process block 610 it is determined that the session request is malicious and indicates cookie theft, because the same session cookie should not exist for two different users.

In decision block 612 it is determined if the session cookie associated with the request matches a session cookie associated with different hardware than the hardware information component of the multi-factor fingerprint. If the matching cookie is associated with different hardware information, it is determined in process block 614 that the session request is malicious and indicates cookie theft. If the matching cookie is not associated with different hardware, it is determined in decision box 616 if the matching cookie is associated with different browser information. If so, then it can be determined that an old cookie was reused after a browser update and that the request is not malicious in process block 618. A new fingerprint can then be stored that includes the new browser information, and the termination flag on the old fingerprint is set to "1" to indicate that the fingerprint is old. In some examples, the old browser information is overwritten with the new browser information. If future session requests are associated with the terminated fingerprint (for which the termination flag is set to 1), it can be determined that the newer fingerprint was in fact an undetected attack. If the browser information matches, then in process block 620 it is determined to be the same device and is determined to be not malicious.

If, however, the session cookie associated with the request does not match a cookie associated with any of the stored fingerprints, then it is determined in decision box 622 if the browser response of the multi-factor fingerprint matches the browser response of a stored fingerprint. If not, then it is determined in process block 624 that the session request is associated with a new device and is not malicious. If the browser response in the multi-factor fingerprint does match another browser response, then it is determined in decision box 626 if the matching browser response is for a different user. If not, and the browser response matches an existing device for the user associated with the session request, then the request is determined not to be malicious (new cookie for an existing device).

If the browser response in the multi-factor fingerprint matches a browser response for a stored fingerprint for a different user, then in process block 630, the session request is determined to be malicious (spoofing attack).

In examples where location information is used, if location information is the only different part of a matching stored fingerprint, the session request can be treated as not malicious, because the user may be using a virtual private network ("VPN") or be logging in from a new location. In some examples, different session cookies with other matching information may indicate the user is using a new browser or using "incognito" or "private" browsing. In some examples, when the session cookies and hardware information are different but other information matches, this indicates a new device is being used (non-malicious), so a new entry can be created in fingerprint storage for the user. When the session cookie and browser information are different but other information matches, a new browser can be indicated (non-malicious), and a new entry for the user can be created in fingerprint storage. When the session cookie and location information are different, this can indicate incognito or private mode (or a different browser) and a new location or VPN use (non-malicious), and a new entry for the user can be created.

Figure 7:
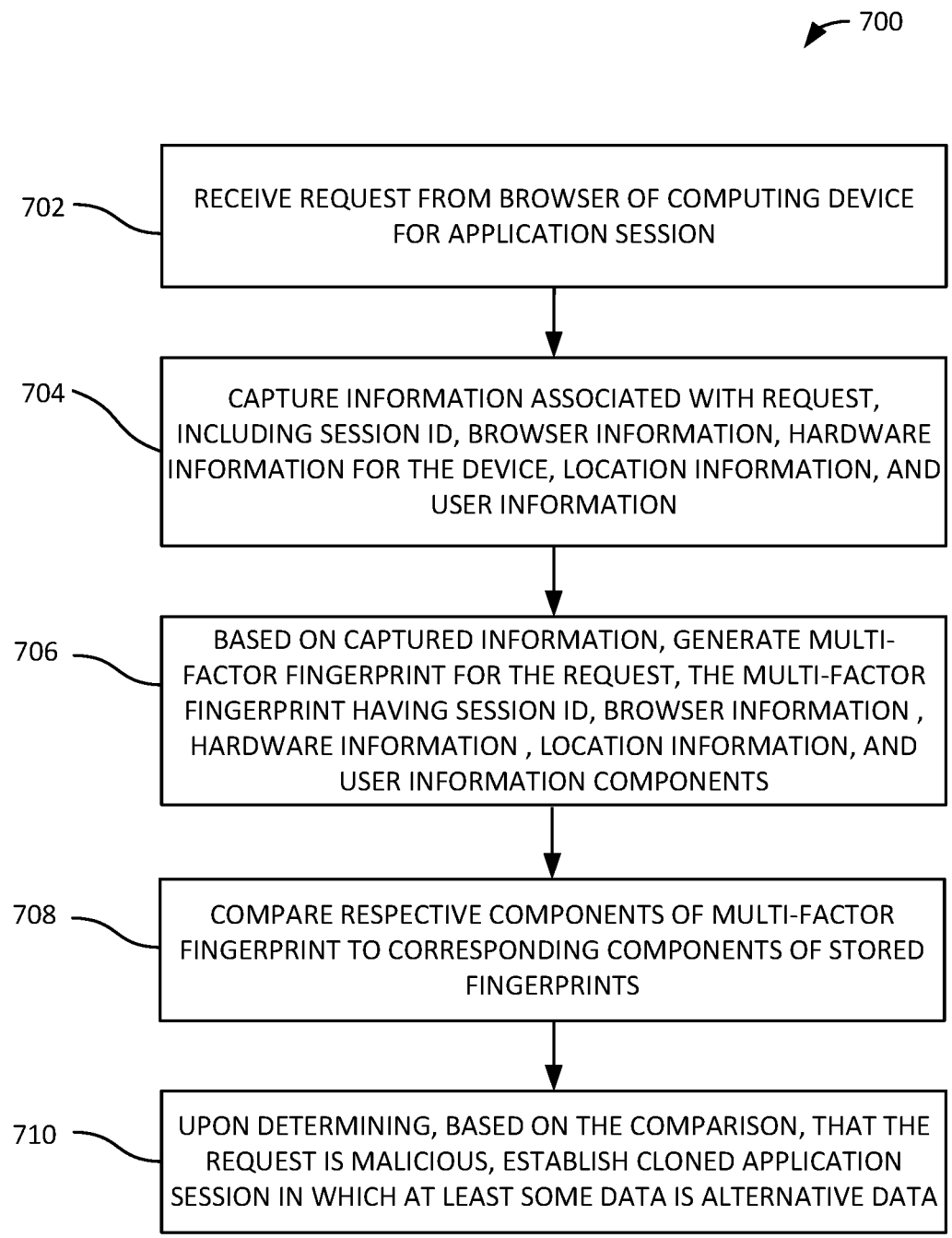
FIG. 7 illustrates an example method of securing an application in which a multi-factor fingerprint includes session identifier, browser information, hardware information, location information, and user information components.

FIG. 7 illustrates an example method 700 of securing an application in which a multi-factor fingerprint includes session identifier, browser information, hardware information, location information, and user information components. In process block 702, a request is received from a browser of a computing device for a session with an application. In process block 704, information associated with the request is captured. The information includes a session identifier, browser information for the device, hardware information for the device, location information, and user information. Based on the captured information, a multi-factor fingerprint for the request is generated in process block 706. The multi-factor fingerprint has separately comparable components including a session identifier component, a browser information component, a hardware information component, a location information component, and a user information component. In process block 708, the respective components of the multi-factor fingerprint associated with the request are compared to corresponding components of a group of stored fingerprints. Upon determining, based on the comparison, that the request for the session is malicious, a cloned application session is established in process block 710. In the cloned application session, at least some of the data provided in the cloned application session is alternative data provided in place of data associated with the application.

Example Computing Systems

Figure 8:
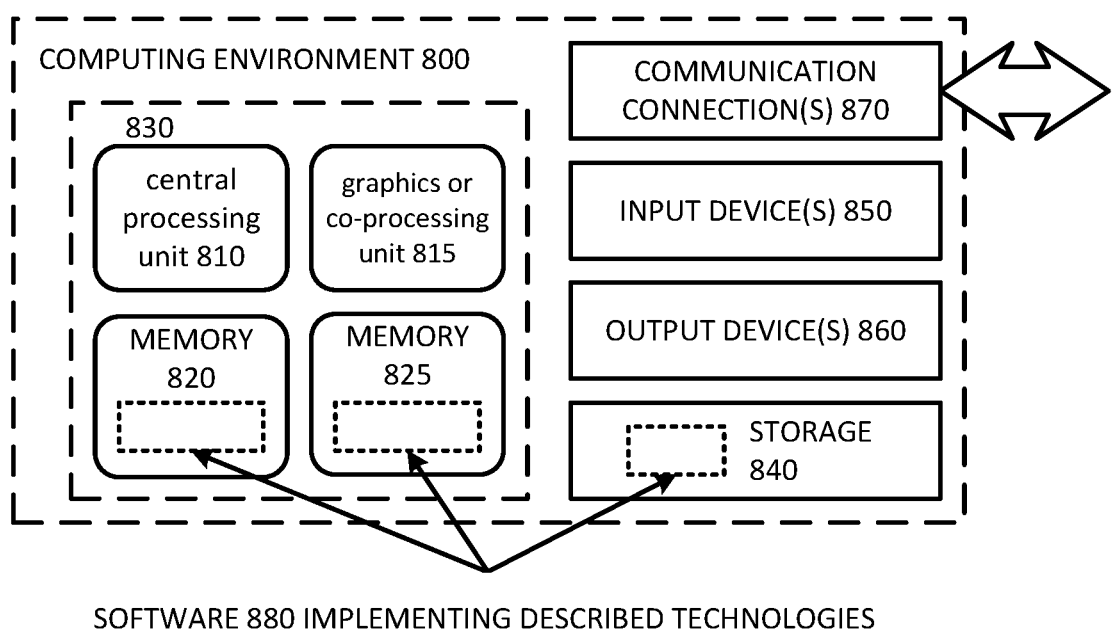
FIG. 8 is a diagram illustrating a generalized implementation environment in which some described examples can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, memory 820 and 825 can store fingerprint manager 208 and comparer 210 of FIG. 2 as well as fingerprint manager 410 and comparer 416 of FIG. 4.

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein. For example, storage 840 can store fingerprint manager 208 and comparer 210 of FIG. 2 as well as fingerprint manager 410 and comparer 416 of FIG. 4.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method for securing an application, the method comprising:
   receiving a request from a computing device for a session with the application;
   capturing information associated with the request, including: a session identifier, software information for the device, and hardware information for the device;
   based on the captured information, generating a fingerprint associated with the request, the fingerprint having session identifier, software information, and hardware information components;
   separately comparing the respective individual components of the fingerprint associated with the request to corresponding components of a group of stored fingerprints;
   determining that the request for the session is malicious based on results of the separate comparison of the individual components of the fingerprint;
   identifying a malicious scenario type for the malicious request for the session based on which of the separately compared individual components of the fingerprint matches a corresponding component of one or more fingerprints in the group of stored fingerprints; and
   limiting access to data associated with the application for the malicious request for the session.

2. The method of claim 1, wherein the request for the session is determined to be malicious when the software information component of the fingerprint matches software information of a different fingerprint in the group of stored fingerprints.

3. The method of claim 1, wherein the request for the session is determined to be malicious when the session identifier component of the fingerprint matches a session identifier of a different fingerprint in the group of stored fingerprints.

4. The method of claim 3, wherein the request for the session is associated with a first user, and wherein the different fingerprint is associated with at least one of a second user or different hardware information than the hardware information component of the fingerprint associated with the request.

5. The method of claim 1, wherein access to the data associated with the application is limited by denying the session request.

6. The method of claim 1, wherein access to the data associated with the application is limited by establishing a cloned application session in which at least some of the data provided in the cloned application session is alternative data provided in place of data associated with the application.

7. The method of claim 1, wherein the captured information further comprises location information, and wherein the fingerprint has a location information component.

8. The method of claim 1, wherein the captured information further comprises user information, and wherein the fingerprint has a user information component.

9. The method of claim 1, wherein the session identifier comprises a session cookie.

10. The method of claim 1, wherein the software information is browser information, and wherein the browser information is generated by a browser running on the device in response to a request or instruction from the application.

11. The method of claim 1, wherein the hardware information comprises at least one of: a number or type of processor of the computing device, a display resolution of a display associated with the computing device, a graphics processing unit of the computing device, or an amount of memory of the computing device.

12. A system, comprising:
a processor; and
one or more computer-readable storage media storing computer-readable instructions that, when executed by the processor, perform operations comprising:
receiving a request from a browser of a computing device for a session with an application;
capturing information associated with the request, including: a session identifier, browser information for the device, and hardware information for the device;
based on the captured information, generating a multi-factor fingerprint for the request, the multi-factor fingerprint having separately comparable components including a session identifier component, a browser information component, and a hardware information component;
separately comparing the respective individual components of the multi-factor fingerprint associated with the request to corresponding components of a group of stored fingerprints;
determining that the request for the session is malicious based on results of the separate comparison of the individual components of the multi-factor fingerprint;
identifying a malicious scenario type for the malicious request for the session based on which of the separately compared individual components of the multi-factor fingerprint matches a corresponding component of one or more fingerprints in the group of stored fingerprints; and
upon determining, based on the comparison, that the request for the session is malicious, limiting access to data associated with the application.

13. The system of claim 12, wherein the request for the session is determined to be malicious when the browser information component of the multi-factor fingerprint matches browser information of a different fingerprint in the group of stored fingerprints, indicating a spoofing attack.

14. The system of claim 12, wherein the session identifier is a session cookie, and wherein the request for the session is determined to be malicious when the session cookie for the multi-factor fingerprint matches a session cookie of a different fingerprint in the group of stored fingerprints, indicating cookie theft.

15. The system of claim 14, wherein the session cookie for the multi-factor fingerprint matches a cookie associated with a different user.

16. The system of claim 14, wherein the session cookie for the multi-factor fingerprint matches a cookie associated with different hardware information than the hardware information component of the multi-factor fingerprint.

17. The system of claim 12, wherein access to the data associated with the application is limited by establishing a cloned application session in which at least some of the data provided in the cloned application session is alternative data provided in place of data associated with the application.

18. The system of claim 12, wherein the captured information further comprises at least one of location information or user information, and wherein the multi-factor fingerprint has a corresponding location information component or user information component.

19. One or more non-transitory computer-readable storage media storing computer-executable instructions for securing an application, the securing comprising:
receiving a request from a browser of a computing device for a session with an application;
capturing information associated with the request, including: a session identifier, browser information for the device, hardware information for the device, location information, and user information;
based on the captured information, generating a multi-factor fingerprint for the request, the multi-factor fingerprint having separately comparable components including a session identifier component, a browser information component, a hardware information component, a location information component, and a user information component;
comparing the respective components of the multi-factor fingerprint associated with the request to corresponding components of a group of stored fingerprints; and
upon determining, based on the comparison, that the request for the session is malicious, establishing a cloned application session in which at least some of the data provided in the cloned application session is alternative data provided in place of data associated with the application.

20. The one or more non-transitory computer-readable storage media of claim 19, wherein the browser information is generated by the browser of the computing device in response to a request or instruction from the application, and wherein the session identifier is a session cookie.

* * * * *